(12) United States Patent
Matsuzaka et al.

(10) Patent No.: US 7,712,983 B2
(45) Date of Patent: May 11, 2010

(54) PRINTING DEVICE AND MOVIE DATA GENERATING METHOD USING PRINTING DEVICE

(75) Inventors: Kenji Matsuzaka, Shiojiri (JP); Kenji Fukasawa, Matsumoto (JP); Seiji Aiso, Shiojiri (JP); Ayahiro Nakajima, Matsumoto (JP); Michihiro Nagaishi, Okaya (JP); Mutsuto Tezuka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 652 days.

(21) Appl. No.: 11/716,520

(22) Filed: Mar. 9, 2007

(65) Prior Publication Data

US 2007/0212144 A1 Sep. 13, 2007

(30) Foreign Application Priority Data

Mar. 10, 2006 (JP) ............................... 2006-65777

(51) Int. Cl.
*H04N 1/00* (2006.01)
*G06F 3/06* (2006.01)

(52) U.S. Cl. ........................................ 400/62; 358/474

(58) Field of Classification Search .................. 400/62, 400/76; 358/474
See application file for complete search history.

(56) References Cited

U.S. PATENT DOCUMENTS

2008/0309993 A1* 12/2008 McKinley et al. ........... 358/474

FOREIGN PATENT DOCUMENTS

| JP | 2002-051283 | 2/2002 |
| JP | 2002-137499 | 5/2002 |
| JP | 2004-064285 | 2/2004 |
| JP | 2004255729 A * | 9/2004 |
| JP | 2005-303907 | 3/2005 |
| JP | 2005-174086 | 6/2005 |

OTHER PUBLICATIONS

Abstract of Japanese Patent Publication No. JP 2002-051283, Pub. Date: Feb. 15, 2002, Patent Abstracts of Japan.
Abstract of Japanese Patent Publication No. JP 2002-137499, Pub. Date: May 14, 2002, Patent Abstracts of Japan.
Abstract of Japanese Patent Publication No. JP 2004-064285, Pub. Date: Feb. 26, 2004, Patent Abstracts of Japan.
Abstract of Japanese Patent Publication No. JP 2005-174086, Pub. Date: Jun. 30, 2005, Patent Abstracts of Japan.
Abstract of Japanese Patent Publication No. JP 2005-303907, Pub. Date: Oct. 27, 2005, Patent Abstracts of Japan.

* cited by examiner

*Primary Examiner*—Leslie J Evanisko
(74) *Attorney, Agent, or Firm*—Martine Penilla & Gencarella, LLP

(57) ABSTRACT

When a printing device inputs image data from a memory card, the printing device prints an order sheet whereon are arranged a chart of the image data and setting entry fields for filling in a variety of settings for generating a movie based on these image data. The user uses various marking fields provided on the order sheet to specify the display times for the various image data and the effects to be performed on the various image data. When the printing device uses a scanner to read in the filled-out order sheet, movie data is generated based on the content that is set using this order sheet. The user is able to generate movies easily using this type of printing device.

15 Claims, 4 Drawing Sheets

PRINTING DEVICE AND MOVIE DATA GENERATING METHOD USING PRINTING DEVICE

CROSS-REFERENCE TO RELATED APPLICATIONS

The present application claims the priority based on Japanese Patent Application No. 2006-65777 filed on Mar. 10, 2006, the disclosure of which is hereby incorporated by reference in its entirety.

BACKGROUND

1. Technical Field

The present invention relates to technologies for generating Movie data using printing devices.

2. Related Art

Recent years have seen a rise in popularity of multifunction printers that have built-in scanners and memory card readers. (See, for example, JP-A-2002-137499.) This printing device has a function for printing, as an order sheet, a chart of image data inputted from a memory card. The user can reserve the desired images for printing by using a writing implemented to fill in a marking field provided on the order sheet and then scanning in the order sheet.

Moreover, certain printing devices have a function for storing image data onto an external memory device that is connected through a USB interface. Thus, modern printing devices are provided with a variety of functions relating to the handling of image data.

And now, in recent years simple movies that show image data continuously have been produced by adding a variety of transition effects between still images that are captured using digital cameras, and then adding background music. (See, for example, JP-A-2005-303907.)

However, because typically the production of this type of movie is done using a computer, it has been extremely difficult for individuals unaccustomed to operating a computer to produce and edit movies.

SUMMARY

An advantage of some aspects of the invention is to generate movies easily using a printing device.

In an aspect of the invention, a printing device for generating movie data comprises an inputting unit that inputs image data; an order sheet printing unit that prints an order sheet which are arranged a chart of the image data and a setting entry field for entering a setting relating to the generation of the movie data; a scanning unit that scans the order sheet; an analyzing unit that analyzes the scanned order sheet and recognizes the setting entered into the setting entry field of the analyzed order sheet; and a movie data generating unit that generates movie data composed of a plurality of the consecutive image data based on the recognized setting.

According to the printing device, various settings relating to the production of movie data for displaying image data continuously can be set using an order sheet wherein a chart of these image data is printed. Consequently, even individuals unaccustomed to operating computers are able to generate movies easily using the printing device alone.

Besides the aspect of the printing device described above, the invention could also take the aspect of a method for generating movie data by printing device equipped with a scanner, or a computer program product for generating movie data by a computer having a printing device and a scanner connected thereto. The computer program may be recorded on a computer-readable recording medium. Media of various kinds, such as a flexible disk, CD-ROM, DVD-ROM, magnetooptical disk, memory card, or hard disk, may be used as recording media. Additionally, the computer program for printing image data may be stored on a server, and utilized over a network.

These and other objects, features, aspects, and advantages of the invention will become more apparent from the following detailed description of the preferred embodiments with the accompanying drawings.

BRIEF DESCRIPTION OF THE DRAWINGS

FIG. 4 shows a form of an order sheet.

DESCRIPTION OF THE PREFERRED EMBODIMENTS

In order to elucidate further the operation and working effects of the present invention described hereinabove, the embodiments of the invention will be discussed below in the following order.

Figure 1:
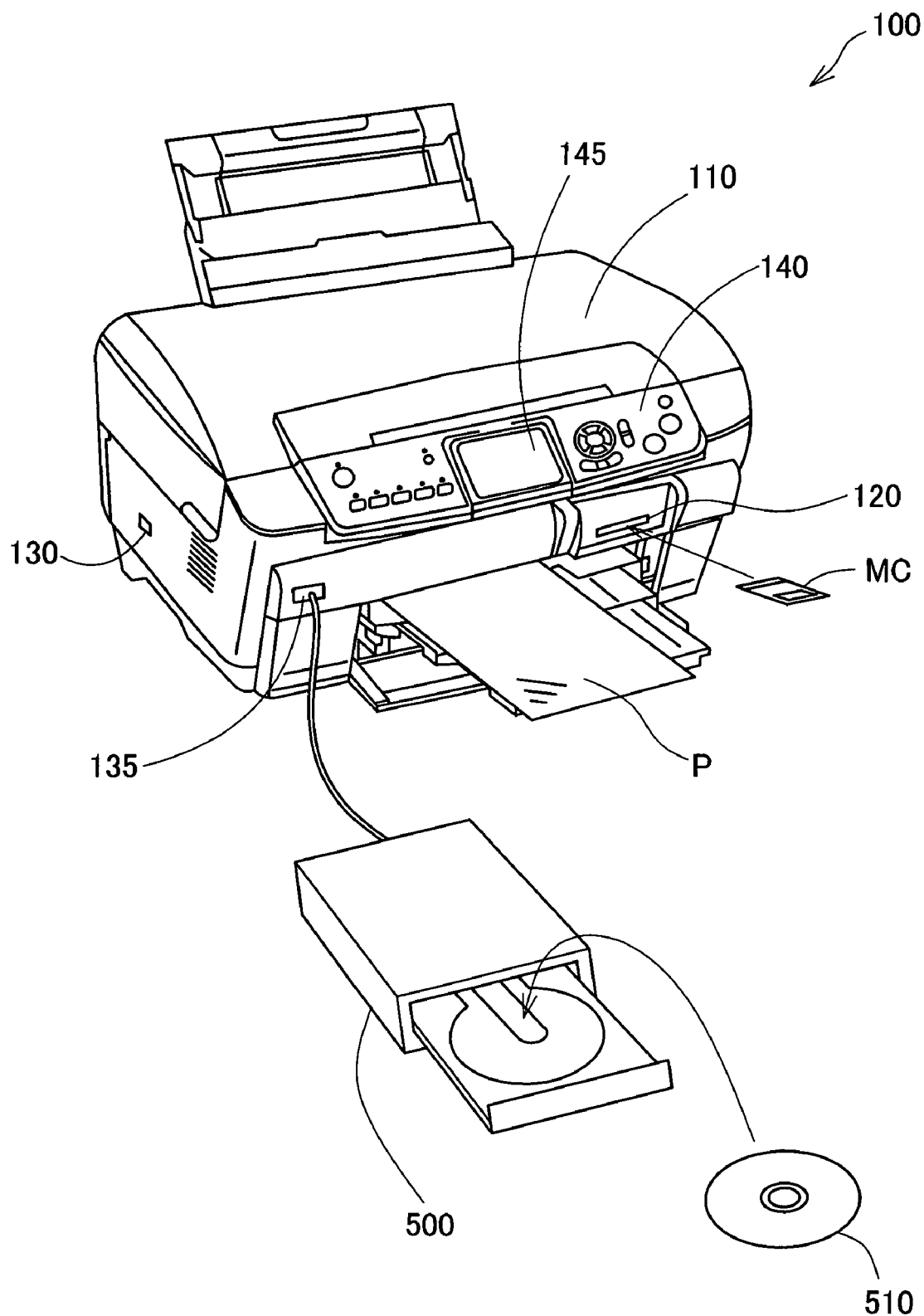
FIG. 1 shows an external view of a printing device.

A. Structure of the Printing Device:
B. Movie Generating Process:
C. Modifications:
D. Other Aspects:

A. Structure of the Printing Device:

FIG. 1 is an explanatory diagram illustrating an external view of a printing device 100 as an embodiment. The printing device 100 is a multifunction printing device, comprising a scanner 110 for scanning images optically, a memory card slot 120 for inserting a memory card MC on which image data is recorded; a first USB interface 130 for connecting to a personal computer; and a second USB interface 135 for connecting to an external memory device 500. The printing device 100 is able to print images scanned by the scanner 110, images read in from the memory card MC, images for which there is a print instruction from the personal computer.

The printing device 100 is provided with an operating panel 140 for performing various operations relating to printing. A liquid crystal monitor 145 is provided in the center part of the operating panel 140. This liquid crystal monitor 145 shows images in the memory card MC. Additionally, this liquid crystal monitor 145 shows a graphical user interface (GUI), used when using the various functions of the printing device 100.

The printing device 100 has a function for inputting image data from a memory card MC to generate a simple movie composed of a plurality of the consecutive image data. The printing device 100 is able to output the movie data for the simple movies to an external memory device 500 connected through the second USB interface 135. For example, an optical disk device that writes data to an optical disk 510, such as a CD-R or a DVD-R, or the like, or an external hard disk device, can be connected as the external memory device 500.

Figure 2:
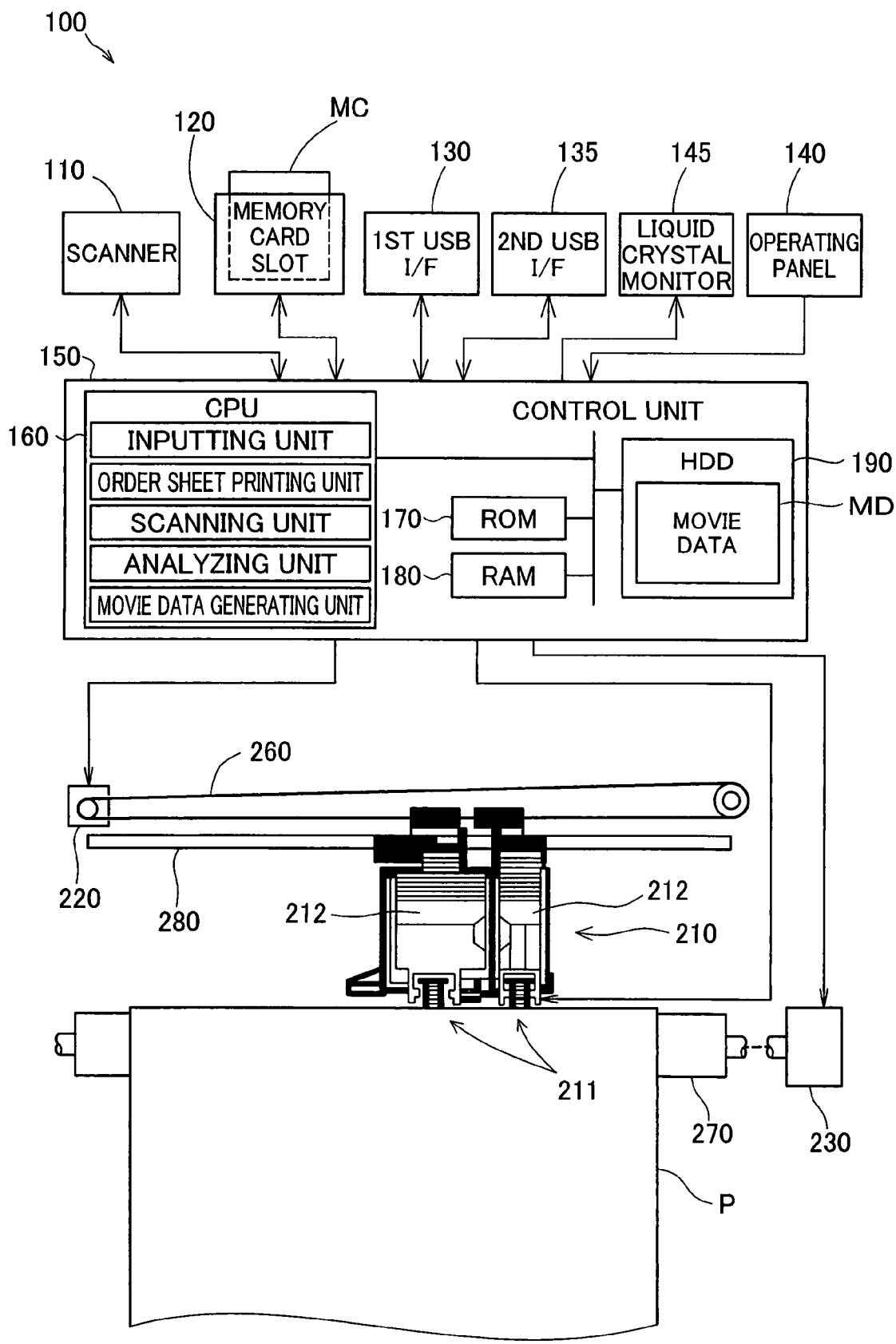
FIG. 2 shows the internal structure of the printing device.

FIG. 2 is an explanatory diagram illustrating the internal structure of the printing device 100. As is shown in figure, the printing device 100, as a mechanism for printing to printer paper P, comprises a carriage 210 on which an ink cartridge 212 is mounted, a carriage motor 220 for driving the carriage 210 in the main scanning direction, a paper feed motor 230 for feeding the printer paper P in the sub-scanning direction.

The carriage 210 has a total of six ink heads 211, corresponding to the various inks that produce the colors of cyan, magenta, yellow, black, light cyan, and light magenta. Ink cartridges 212, containing these inks, are installed on the carriage 210. The ink that is supplied from the ink cartridges 212 to the ink heads 211 is ejected onto the printer paper P by means of actuating piezo elements, not shown.

The carriage 210 is held so as to be able to move on a slide rod 280 that is provided in parallel with the axial direction of a platen 270. The carriage motor 220 drives the carriage 210 reciprocatingly parallel to the axial direction of the platen 270, or in other words, in the primary scan direction, through rotating a driving belt 260.

The paper feed motor 230 feeds the printer paper P in the direction that is perpendicular to the axial direction of the platen 270 by rotating the platen 270. That is, the paper feed motor 230 can move the carriage 210 in the sub-scanning direction relative to the printer paper P.

The printing device 100 has a control unit 150 for controlling the operation of the ink heads 211, the carriage motor 220, and the paper feed motor 230. The scanner 110, shown in FIG. 1, the memory card slot 120, the first USB interface 130, the second USB interface 135, the operating panel 140, the liquid crystal monitor 145 are also connected to the control unit 150, which controls the operations thereof.

The control unit 150 comprises a CPU 160, a ROM 170, a RAM 180, and a hard disk 190. A control program for controlling the operations of the printing device 100 is stored in the ROM 170. The CPU 160 performs a variety of processes, described below, through loading the control program into the RAM 180. The CPU 160 corresponds to the "inputting unit," "order sheet printing unit," "scanning unit," "analyzing unit," and "movie data generating unit" herein.

The movie data MD that is generated by the movie generating process described below is stored on the hard disk 190. The image data read in from the memory card MC can also be stored on the hard disk 190. Note that while in the present embodiment a hard disk is provided for storing the movie data MD, a semiconductor memory, such as a flash memory, can be provided instead.

Figure 3:
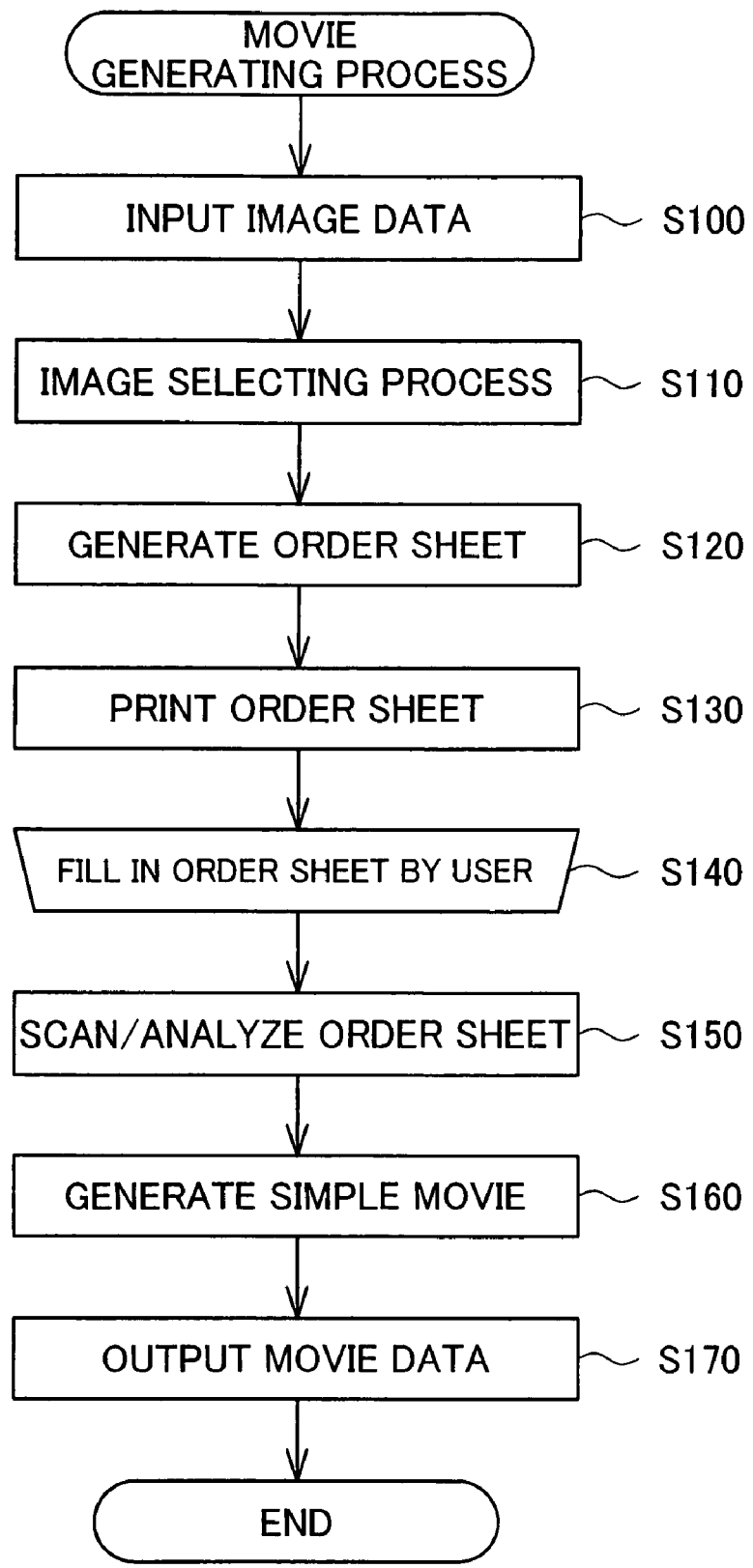
FIG. 3 is a flowchart of the movie generating process.

B. Movie Generating Process:

FIG. 3 is a flowchart of the movie generating process performed by the CPU 160 based on the control program. The movie generating process is executed when a menu for generating a simple movie is selected by the user from the GUI displayed on the liquid crystal monitor 145.

When this process is executed, the CPU 160 inputs image data from the memory card MC (Step S100). When the image data is stored on the hard disk 190, the CPU 160 may input image data from the hard disk 190.

When the image data is inputted, the CPU 160 executes an image selecting process that automatically selects, from the inputted image data, candidate images for movie generation (Step S110). In more detail, this image selecting process is a process for automatically selecting candidate images for generating the movie through analyzing the inputted image data to determine whether or not they are blurred or out of focus, and whether or not there are exposure problems, and eliminating, from the candidates for generating the movie, those image data judged to be taken poorly.

In this image selecting process, the CPU 160 uses a well-known image processing technique to perform an edge-extracting process on each of the image data. When the widths of the extracted edges exceed a specific criterion, the CPU 160 judges the image to be blurred or out of focus. And the CPU 160 omits the image data from being included in the movie generation. Moreover, when the area of the white region or black region the within the image data exceeds a specific criterion, the CPU 160 determines that there is an exposure problem, and omits the image data from being included in the movie generation. In this way, in the present embodiment the CPU 160 can eliminate in advance, from being included in the movie generation, image data that is judged to have been taken poorly, thus making it possible to improve the quality of the movie that is generated. Moreover, the performance of this type of process make it possible to reduce the amount of work on behalf of the user, because it is possible to reduce the number of image data that are arranged on the order sheet, described below.

The CPU 160 generates an order sheet on which are arranged a chart of the image data selected by the image selecting process and a setting entry field wherein the user fills in a variety of settings for generating the movie (Step S120). Then the CPU 160 controls the ink heads 111, the paper feed motor 230, and the carriage motor 220, to print the order sheet that has been generated (Step S130).

Figure 4:
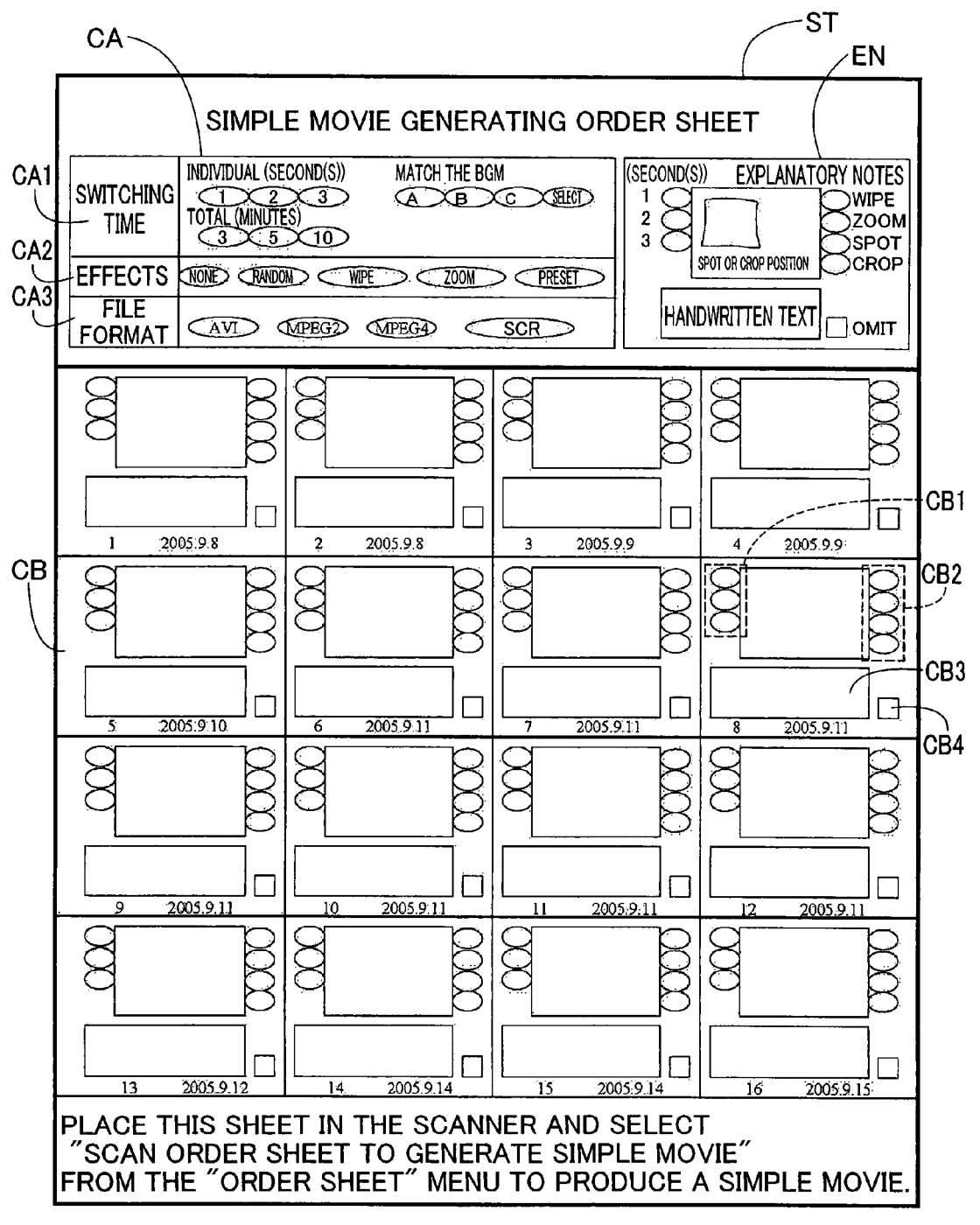

FIG. 4 is an explanatory diagram illustrating a form of an order sheet ST printed in this way. A global settings entry field CA, for settings that are applied to all image data, and an individual settings entry field CB, for settings that are for each individual image, are provided as setting entry fields in the order sheet ST shown in FIG. 4.

The global settings entry fields CA comprises a time setting field CA1 for specifying the default display time for each image data, an effect setting field CA2 for specifying default effects to be performed for each image, and a format specification field CA3 for specifying the data format of the movie data that will ultimately be generated.

The time setting field CA1 includes a marking field for setting the display time per individual image to either "1 second," "2 seconds," or "3 seconds," a marking field for adjusting the display time of each individual image data depending on the total playback time by setting the playback time of the entire movie to "3 minutes," "5 minutes," or "10 minutes," and a marking field for adjusting the display time of each individual image data depending on the playback time for the background music (BGM) by setting the background music that will be played back at the same time as displaying the movie to either "Music A," "Music B," "Music C," or "Select." The user can use a writing implement to mark one of the prepared marking fields to set the default display time (switching time) for the image data. Note that when "Select" is specified for the background music, then, after Step S150, described below, the CPU 160 performs a process wherein the user uses the operating panel 140 to select the desired music.

The effect setting field CA2 includes a marking field for setting either "None," "Random," "Wipe," "Zoom," or "Select" as the type of effect that is applied to each of the image data. "None" indicates a mode wherein the image data is displayed sequentially without performing any particular effect. "Random" indicates a mode wherein the CPU 160 selects, from all of the effects, an effect at random to apply. "Wipe" indicates a mode wherein images are displayed through shifting an earlier image off of the screen to the top, bottom, left, or right, and then displaying the next image. "Zoom" indicates a mode wherein an image is displayed while gradually growing larger. "Preset" indicates a mode wherein effects are performed in a preset order.

Note that in addition to the types of effects listed here, it is possible to enable the specification of, for example, a color-converting process for converting color images into monochrome images or sepia scales, a deformation process for converting rectangular images into round shapes, or image processors on still images, such as mosaic processes, trimming processes, embossing processes, and the like. Moreover, it is also possible to enable the specification of transition effects that generate intermediate images when switching the display of two different image data, such as "Cut," which replaces the image instantaneously, "Fade," which causes images to gradually disappear and appear, "Slide," which causes one image to slide onto or off of another image, or "Dissolve" or "Stretch," or the like.

The format specification field CA3 is provided with a marking field for setting either "AVI," "MPEG 2," "MPEG 4," or "SCR(Screensaver)" as the data format of the movie data to be generated. Note that in addition to the formats that have been listed as the data formats for the movie data, it is also possible to use a variety of other data formats such as the MPEG 1 format, the animated GIF format, the motion JPEG format, the scenario data format, or the like. Note that the scenario data format is a data format that defines, for example, the display sequence and display times of image data, and the effects when displaying the image data.

An individual setting entry field CB for settings for each individual image is provided for each thumbnail image shown in the chart of image data. Each individual setting entry field comprises an individual time setting entry CB1 for setting the display time for that image data, an individual effect setting field CB2 for setting the effect to be performed on that image data, a text entry field CB3 for entering text that is displayed superimposed on that image data, and a omission specification field CB4 for omitting that image data from inclusion in the generation of the movie.

The individual time setting field CB1 is structured from 3 marking fields, positioned at the left side of the thumbnail image. Each marking field displays either "1 second," "2 seconds," or "3 seconds" as the display time, as shown in the explanatory note EN at the upper right part of the figure. When the display time is set using the individual time setting field CB1, this display time is applied with priority over the default display time that was set using the time setting field CA1.

The individual effect setting field CB2 is structured from 4 marking fields, arranged at the right side of the thumbnail image. Each marking field displays "Wipe," "Zoom," "Spot," or "Crop" as the effect type, as shown in the explanatory note at the upper right part of the figure. The "Wipe" and "Zoom" effects are as described above. "Spot" is an effect that gradually changes the display area of the image from being the entire image to being a specified area thereof. On other hand, "Crop" is an effect that displays only the specified area. When an effect is set using the individual effect setting field CB2, the effect is applied with priority over the default effect that has been set using the effect setting field CA2. Note that a marking field may also be provided, in the individual effect setting field CB2, for specifying that no effect is to be performed. When this marking field is selected, then the CPU 160 will not perform the default effect.

When "Spot" or "Crop" is specified, the user draws a spotting or cropping area in the thumbnail image, using a writing implement, as shown in the explanatory note EN. This makes it possible for the user to specify with ease the positions for performing these effects. The areas may be closed shapes, rectangles, or curved shapes. The CPU 160 is able to detect the region wherein there is a marking in the thumbnail image through calculating color differentials between the printed thumbnail image and the scanned thumbnail image.

The text entry field CB3 is placed below the thumbnail image. When the user wishes to display handwritten text combined with the image data, the user writes the desired text in the text entry field CB3. Of course, symbols, illustrations, and so forth, can be entered in the text entry field CB3 instead of just text. Note that while in the present embodiment handwritten text is entered into the text entry field CB3, the handwritten text may instead be filled in superimposed on the thumbnail image, in the same manner as when specifying the spot or crop area.

The omission specification field CB4 is positioned at the lower right of the thumbnail image. When the user wishes to omit the image data from inclusion in the generation of the movie, the user uses a writing implement to check the omission specification field CB4.

Here the explanation will return to FIG. 3. When the order sheet ST shown in FIG. 4 is printed in the Step S130, the user uses a writing implement to fill in the necessary fields on the order sheet ST (Step S140). When the user has finished the entries, the user places in the filled-in order sheet ST in the scanner 110 and then uses the operating panel 140 to perform the specific scanning operation.

When the scanning operation by the user is detected, the CPU 160 uses the scanner 110 to scan the order sheet ST (Step S150). After the order sheet ST has been scanned, the CPU 160 performs an analysis process that analyzes the scanned order sheet ST and recognizes the settings entered into the setting entry field of the order sheet ST. When it is detected by the analysis process that the marking field that indicates "Select" in the time setting field CA1 is filled in, the CPU 160 displays, on the liquid crystal monitor 145, a list of the background music that is stored in the printing device 100, and performs a process wherein the user is allowed to select the desired background music from this list.

When the order sheet ST has been scanned and analyzed, the CPU 160 performs the generation of the simple movie following the various items that have been set using the order sheet ST (Step S160). In other words, the effects specified by the global setting entry field CA and the individual setting entry fields CB are performed on those image data for which the omission specification field CB4 is not checked, and the display times are set to the times a specified by the global setting entry field CA or the individual setting entry fields CB. Moreover, the simple movie that displays each of the image data continuously is generated in the data format specified by the format specification field CA3, and is stored on the hard disk 190 of the control unit 150.

After the CPU 160 has stored in the movie data to the hard disk 190, next the movie data is outputted to the external memory device 500 (Step S170). When the output to the external memory device 500 has been completed, the movie data that is stored on the hard disk 190 is deleted, and the sequence of movie-generating processes described above is completed.

The printing device 100 as set forth in the present embodiment, described above, makes it possible to use the order sheet ST to set the various settings pertaining to the generation of movie data. Because of this, even individuals who are unaccustomed to operating a computer are able to generate movies easily using the printing device 100 alone. Moreover, because the use of the order sheet ST makes it possible to simultaneously select the images on which the movie generation is to be based and to select the effects to be performed on those images, this can improve the ease of use for the user. Furthermore, because the necessary marking fields are arranged around the thumbnail images on the order sheet ST, the user is able to specify the settings intuitively once the user understands the details of the settings in the various marking fields.

C. Modifications:

While in the above the explanation was for the embodiment according to the present invention, the present invention is not limited to this type of the embodiment, but rather, of course, may be structured in a variety of ways in a scope that does not deviate from the essence thereof. For example, modifications such as the following are possible:

C1. Modification 1:

Although in the embodiment described above, the printing device 100 omits those images that were taken poorly, through executing an image selecting process in Step S110 in FIG. 3, prior to the printing of the order sheet ST, instead this image selecting process may be omitted. Doing so makes it possible to execute the processing more quickly.

C2. Modification 2:

While in the embodiment described above, the printing device 100 outputted the movie data to the external memory device 500 in Step S170 of FIG. 3, alternatively, the image data that is the source for generating movie may also be outputted along with the movie data. Doing so it possible for the user to easily obtain and print, for example, any image that is appealing in the movie that has been generated.

C3. Modification 3:

The printing device 100 may print the thumbnail images that are displayed in the chart of image data using a specific light color when the order sheet ST is printed. Doing so makes it possible to specify clearly the areas wherein the "Spot" and "Crop" are to be performed. The CPU 160 scans in any color aside from the light color when scanning the order sheet ST. This makes it possible to discriminate easily the spot or crop areas that are written in superimposed on the thumbnail images.

C4. Modification 4:

The printing device 100 may be provided with a function for generating a label for an optical disk 510 using the image data that is the source for generating the movie data. Doing so makes it possible for the user to understand easily the type of movie that is recorded on the optical disk 510.

C5. Modification 5:

While in the embodiment described above, the printing device 100 composites the handwritten text, entered into the text entry field CB3, as is, onto the image, instead a well-known optical character recognition (OCR) technology may be used to convert into a text format before compositing. Moreover, the information that has been converted into text may be recorded in the header information of the image data.

C6. Modification 6:

In addition to the various fields explained in the embodiment described above, fields for specifying the images that will be the starting point and ending point for the movie, an entry field for specifying the image display sequence, a field for specifying the angle of rotation of an image, a field for specifying the text font when converting handwritten text into a text format and then compositing, and the like, may be provided on the order sheet ST. The printing device 100 generates the movie based on the settings filled in these fields.

C7. Modification 7:

When "preset" is selected in the effect setting field CA2 of the order sheet ST, shown in FIG. 4, the CPU 160 may identify the features of each of the images and then automatically select the effect to apply depending on those features. For example, if there is, in the image data, a skin-tone area that is larger than a specific surface area, then it can be determined that the face of a person has been photographed, and for this type of image data, it is possible to perform the zoom or trim effects on the part that is the face. In addition, it is possible to perform processes for setting the wipe and slide directions and speeds depending on the amount of movement and direction of movement by calculating the amount of movement of a moving object that is photographed in each of the images through applying the well-known gradient image processing technique on two continuous image data.

C8. Modification 8:

While in the embodiment described above, the movie data was generated from still images, instead the printing device 100 may generate a single movie from multiple movies. In this case, the printing device 100 prints an order sheet ST with thumbnail images of one scene from each of the movies that are the raw materials, and the user specifies the effects and playback times for the movie using the marking fields. This type of structure makes it possible to edit not only simple movies, but also normal movies, with ease. Of course, movies may be generated mixing movies and still images.

C9. Modification 9:

In the movie generating process as set forth in the embodiment described above, the CPU 160 may playback the movie data on the liquid crystal monitor 145 after the generation of the movie data has been completed. Doing this makes it possible for the user to preview, prior to outputting the movie to the external memory device 500, the movie that was generated using the order sheet ST.

C10. Modification 10:

In the movie generating process as set forth in the embodiment described above, the CPU 160 may display, on the liquid crystal monitor 145, a list of the settings that have been set using the order sheet ST, after scanning the order sheet in Step S150, to make it possible to modify the settings through specific operations by the user. This makes it possible to modify flexibly settings that have been set using the order sheet ST.

C11. Modification 11:

In the embodiment described above, the printing device 100 can generate movie data by itself. Alternatively, the printing device 100 may be connected to a computer and a specific program may be installed on the computer to execute processes that are the same as the movie-generating processes shown in FIG. 3. Because this type of structure makes it possible to use the order sheet ST even when generating movies using a computer, it is possible even for individuals that are not accustomed to the operation of computers to generate movies easily.

D. Other Aspects:

The present invention may be embodied in the following aspects. For example, in the printing device described above, the order sheet printing unit may print a field for selecting image data to be the basis for generating the movie data as the setting entry field, and the movie data generating unit may generate the movie data using the image data selected by the setting entry field.

This structure makes it possible to the use of the order sheet to select with ease the image data to be the source for generating the movie data.

In the printing device structured as described above, the order sheet printing unit may print a field for specifying the display time of the image data, as the setting entry field, and the movie data generating unit may set the time over which the image data is displayed during the playback of the movie data to the time specified in the setting entry field.

This structure makes it possible to set the display time for each image easily using the order sheet.

In the printing device with the structure described above, the order sheet printing unit may print, as the setting entry field, a field for specifying the type of image process to be performed on the image data, and the movie data generating unit may generate the movie data by performing, on the image data, the image processing specified by the setting entry field.

This structure makes it possible to use an order sheet to specify easily the image process to perform on the various image data. These sorts of image processes include, for example, color conversion processing to convert color images into monochrome images or sepia tone images, deformation processes for changing rectangular images into round images, mosaic processes, trimming processes, embossing processes, and so forth.

In a printing device structured as described above, the image process may be a process for generating an intermediate image when switching the display of two of the images when playing back the movie data.

With this type of structure it is possible to use an order sheet to specify easily transition effects to be performed when switching image data displays. The transition effects include, for example, "Cut" for replacing images instantaneously, "Wipe" for replacing one image with another as a borderline moves, "Fade" wherein an image gradually disappears and an image gradually appears, "Slide" where an image is slid onto or off of another image, along with "Dissolve," "Stretch," and the like.

In the printing device structured as described above, the setting entry fields may include a global setting entry field for settings for all of the image data, and individual setting entry fields for settings for individual image data, prepared for each of the individual image data, and the movie data generating unit may apply with priority the settings specified using the individual setting entry field over the settings specified using the global setting entry fields, to generate the movie data based on the settings entered in the setting entry fields.

Given this type of structure, it is possible to specify a variety of settings automatically for all image data even if the settings are not specified for the individual image data, as long as settings for all of the image data are specified through the global setting entry fields. Moreover, even in cases wherein the settings are specified using the global setting entry fields, if settings for individual image data are specified using the individual setting entry fields, the settings by the individual setting entry fields are applied with priority. Because of this, the user is able to specify various settings flexibly.

In the printing device with the structure described above, a feature identifying unit for identifying features in each of the image data may also be provided, where the order sheet printing unit may print, in the setting entry fields, an automatic selection field for selecting automatically the image process to be performed on the image data, and the movie data generating unit may perform, on each of the image data, the image process according to the identified features of each of the image data when the analyzing the unit has detected that the automatic selection field has been specified, as a result of the analysis of the scanned order sheet.

Given this type of structure, image processing is performed on the image data automatically depending on the features thereof, even if the user has not specified individually the image processing to be performed on each of the individual image data, enabling improved ease-of-use. Given this type of structure, it is possible to perform image processing automatically to zoom in on a face portion or to trim a face portion, for example, if the face of a person is captured in the image data. Moreover, if the same moving object is captured in two different image data, then, depending on the direction of motion of the moving object, it is possible to perform processes for setting the direction of a wipe or a slide.

In the printing device with the structure, the order sheet printing unit may print, as an setting entry field, a field for specifying the audio to be played back when the movie data is displayed, and the movie data generating unit may record the audio, specified by the setting entry field, along with the movie data.

This type of structure makes it possible to use an order sheet to generate easily a movie with audio.

In a printing device with the structure, the movie data generating unit may adjust the display time of each of the image data depending on the playback time of the specified audio.

This type of structure can cause the audio playback time and the movie playback time to be equal to each other, thus enabling the generation of a good movie.

In the printing device with the structure, an identifying unit for identifying those image data, from among the inputted image data, that were taken poorly, may be provided, wherein the order sheet printing unit may print, on the order sheet, a chart of those image data aside from those image data identified by the identifying unit as having been taken poorly, and the movie data generating unit may generate the movie data using only those image data other than the image data identified as having been taken poorly.

This type of structure makes it possible to omit, from the image data that can serve as the source for generating movie data, those image data that were taken poorly, and thus possible to improve the quality of the movie data produced. Whether or not the image data was taken poorly can be determined based on whether or not there is blurring, poor focus, or incorrect exposure.

In the printing device with the structure, the order sheet printing unit may print, as an setting entry field, a field for specifying the data format for the movie data, and the movie data generating unit may generate the movie data in accordance with the data format specified by the setting entry field.

This type of structure makes it possible to set flexibly the data format of the movie data that is generated. The data formats for the movie data include, for example, AVI, MPEG 1, MPEG 2, MPEG 4, animated GIF, motion JPEG, and screensaver (SCR) formats.

The printing device of the structure may also be provided with an outputting unit for outputting to an external memory device the movie data that is generated by the movie data generating unit.

This type of structure makes it possible to read and playback the generated movie data on a variety of devices. The external memory devices include, for example, a hard disk drive, an optical disk drive, a semiconductor memory device, and so forth.

In a printing device of the structure, the output unit may be provided with a unit for outputting, to the external memory device, the image data that was the basis for generating the movie data, in addition to outputting the movie data.

This type of structure makes it possible for an image to be obtained and printed easily if there is an image that is appealing in the movie data that is viewed, thus making it possible to increase the ease-of-use for the user.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printing device for generating movie data, the printing device comprising:
   an inputting unit that inputs image data;
   an order sheet printing unit that prints an order sheet which are arranged a chart of the image data and a setting entry field for entering a setting relating to the generation of the movie data;
   a scanning unit that scans the order sheet;

an analyzing unit that analyzes the scanned order sheet and recognizes the setting entered into the setting entry field of the analyzed order sheet; and a movie data generating unit that generates movie data composed of a plurality of consecutive image data based on the recognized setting.

2. A printing device according to claim 1, wherein the order sheet printing unit prints, as the setting entry field, a field for selecting the image data to be the basis for generating the movie data; and the movie data generating unit generates the movie data composed of the plurality of consecutive image data selected by the setting entry field.

3. A printing device according to claim 1, wherein the order sheet printing unit prints, as the setting entry field, a field for specifying the display time of the image data; and the movie data generating unit sets the time over which the image data is displayed during the playback of the movie data to the time specified by the setting entry field.

4. A printing device according to claim 1, wherein the order sheet printing unit prints, as the setting entry field, a field for specifying the type of image process to be performed on the image data; and the movie data generating unit generates the movie data by performing, on the image data, the image process specified by the setting entry field.

5. A printing device according to claim 4, wherein the image process is a process for generating an intermediate image when switching the display of two of the image data when playing back the movie data.

6. A printing device according to claim 4, further comprising:

a feature identifying unit for identifying features of each of the image data; wherein the order sheet printing unit prints, as the setting entry field, an automatic selecting field for selecting automatically the image process to be performed on the image data; and the movie data generating unit performs, on each of the image data, the image process depending on the identified features for each of the image data when the analyzing unit has detected that the automatic selecting field has been specified, as a result of the analysis of the scanned order sheet.

7. A printing device according to claim 1, wherein the setting entry field includes a global setting entry field for specifying settings for all of the image data, and individual setting entry fields for specifying settings for individual image data, provided for each of the image data; and the movie data generating unit generates the movie data based on the setting that is entered into the setting entry field by applying with priority the setting that is specified by the individual setting entry field to the setting that is specified by the global setting entry field.

8. A printing device according to claim 1, wherein the order sheet printing unit prints, as the setting entry field, a field for specifying audio to be played back when the movie data is displayed; and the movie data generating unit records the audio, specified by the setting entry field, along with the movie data.

9. A printing device according to claim 8, wherein the movie data generating unit adjusts the display time for each of the image data depending on the playback time of the specified audio.

10. A printing device according to claim 1, further comprising:

an identifying unit for identifying the image data, from among the inputted image data, that were taken poorly, wherein the order sheet printing unit prints on the order sheet a chart of the image data other than the image data identified, by the identifying unit, as having been taken poorly; and the movie data generating unit generates the movie data using the image data other than the image data identified as having been taken poorly.

11. A printing device according to claim 1, wherein the order sheet printing unit prints, as the setting entry field, a field for specifying the data format of the movie data; and the image data generating unit generates the movie data in accordance with the data format specified by the setting entry field.

12. A printing device according to claim 1, further comprising an outputting unit for outputting, to an external memory device, the movie data generated by the movie data generating unit.

13. A printing device according to claim 12, wherein the outputting unit outputs, to the external memory device, the image data that was the basis for generating the movie data, along with outputting the movie data.

14. A method for generating movie data by printing device equipped with a scanner, the method comprising:

inputting image data;

printing an order sheet which are arranged a chart of the image data and a setting entry field for entering a setting relating to the generation of the movie data;

scanning the order sheet;

analyzing the scanned order sheet and recognizing the setting entered into the setting entry field of the analyzed order sheet; and generating movie data composed of a plurality of consecutive image data based on the recognized setting.

15. A computer program product for generating movie data by a computer having a printing device and a scanner connected thereto, the computer program product comprising:

a computer readable medium; and a computer program stored on the computer readable medium, the computer program causing a computer to implement the functions of:

inputting image data;

printing, using the printing device, an order sheet which are arranged a chart of the image data and a setting entry field for entering a setting relating to the generation of the movie data;

scanning, using the scanner, the order sheet;

analyzing the scanned order sheet and recognizing the setting entered into the setting entry field of the analyzed order sheet; and generating movie data composed of a plurality of consecutive image data based on the recognized setting.

\* \* \* \* \*